June 16, 1936.  F. BULLOCK  2,044,239
AIR CONDITION INDICATOR
Filed Nov. 7, 1934
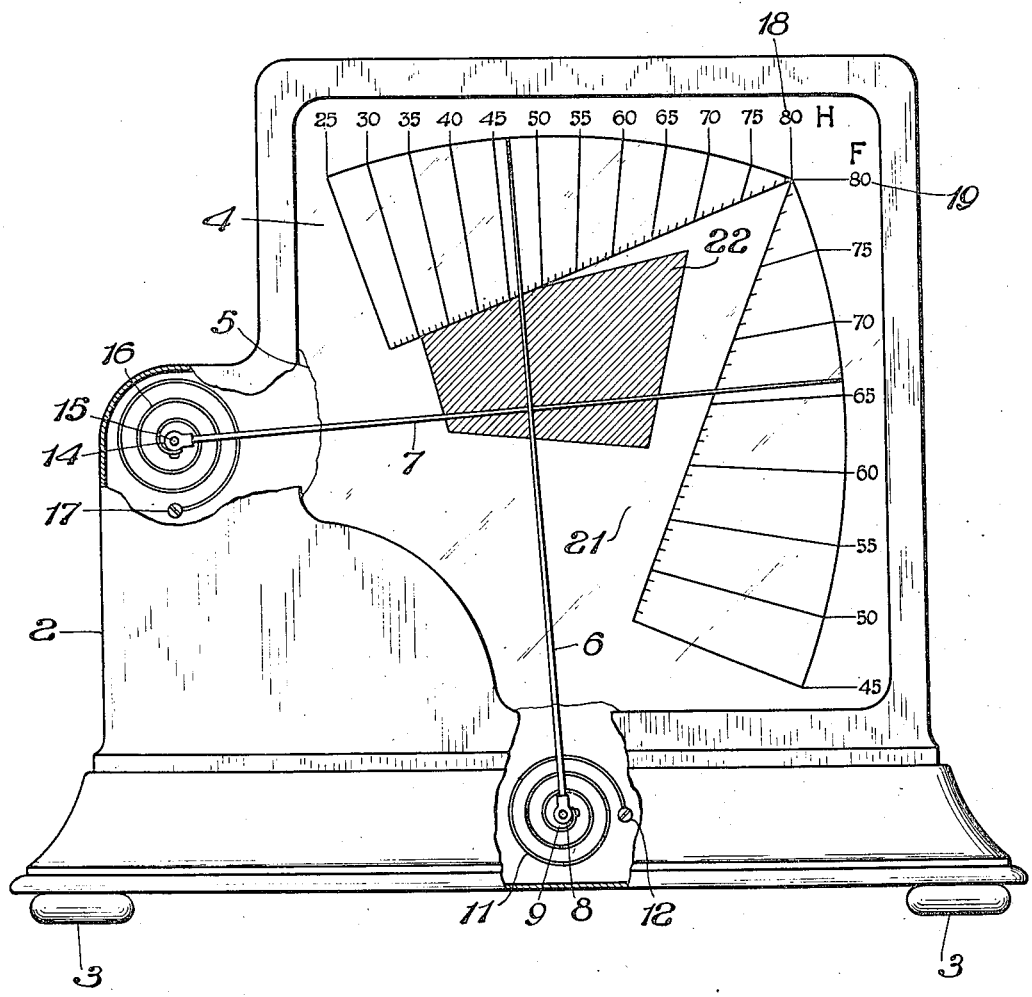
INVENTOR
*Frank Bullock*
BY
*Arthur H Watson*
ATTORNEY Patented June 16, 1936

2,044,239

UNITED STATES PATENT OFFICE 2,044,239

AIR CONDITION INDICATOR

Frank Bullock, Lake Geneva, Wis., assignor to Middlebury Electric Clock Corporation, Chicago, Ill., a corporation of Illinois Application November 7, 1934, Serial No. 751,872

3 Claims. (Cl. 73—24)

This invention relates to improvements in air conditioning indicators.

Various devices have been provided from time to time in the past for the purpose of indicating to occupants of a room the temperature and relative humidity of the air in order to aid in the keeping of the air at a comfortable and healthy temperature and humidity. Such devices, however, usually comprise a hygrostat and a thermometer, each giving its own reading of humidity and temperature respectively, and it is therefore necessary that tables or charts be consulted if one is to ascertain whether the relative humidity for the temperature given, or vice versa, is most conducive to health and comfort.

It is, therefore, an object of my invention to provide an improved air condition indicator which will give by direct reading positive information as to whether or not the temperature and relative humidity are properly proportioned for health and comfort.

Another object is to provide an indicator as described which will enable one, in addition to reading composite temperature and relative humidity, to read both temperature and relative humidity separately.

Other objects and advantages will be apparent after reading the following specification and claims and after consideration of the drawing forming a part of the specification wherein I have illustrated in elevation and partially in section an air condition indicator constructed in accordance with the invention.

With reference to the drawing, the indicator may comprise a casing 2 of moulded composition adapted to stand upright upon small legs 3 so that air may be admitted to the casing from beneath. A dial 4 is supported within the casing and protected by a cover glass 5 spaced away therefrom a suitable distance to allow the free movement of indicator hands 6 and 7 over the dial.

The indicator hand 6 is secured to a sleeve 8 rotatably mounted upon a fixed horizontally extending pin 9 located within the casing below the horizontal mid-point of the dial 4. A hygroscopic element 11 in spiral form is located about the sleeve 8, the inner end being secured to the sleeve and the outer end to a post 12 fixed relative to the casing 2. The element may be made of a brass strip having a strip of paper cemented upon one side thereof, the paper being of a type of paper subject to extreme shrinkage and stretching in proportion to the dryness or moisture. If desired, a strip of catgut may be used instead of paper.

The hand 7 is secured to a sleeve 14 rotatably mounted upon a pin 15 fixed in a horizontal plane to the left mid-portion of the dial 4. A spiral bi-metallic element 16 is fixed at its inner end to the sleeve 14 and at its outer end to a post 17 fixed to the casing 2.

The hands 6 and 7 are thus arranged so that they swing across one another, the hand 6 in response to relative humidity and the hand 7 in response to temperature. Indicia 18 on the dial 4 providing a scale calibrated in per cent relative humidity are in register with the hand 6, and indicia 19 providing a scale calibrated in degrees Fahrenheit are in register with the hand 7, the two scales being disposed virtually at 90° to one another.

In the central portion of the dial 4 I have represented an area 21 in outline wherein the two hands 6 and 7 may cross throughout their entire ranges of movement in response to relative humidity and temperature changes respectively. Within the area 21 is a lesser and shaded area 22 representing a zone wherein the humidity is proper with respect to temperature for health and comfort. This zone may be determined by curves to be found in technical literature on heating, ventilation and air conditioning, and is well known to those skilled in the art.

In operation, the indicator, when placed in a room for observation, will give direct readings in both relative humidity and temperature, and the point where the hands 6 and 7 cross, if over the zone 22, will indicate that the humidity is proper for the temperature indicated. If the hands do not cross over the zone 22, then either the humidity must be changed as by the use of an humidifier or the temperature must be changed to provide an air condition that is necessary for health and comfort.

While I have herein illustrated and described in detail one form of the invention wherein the indicator hands cross at substantially 90°, it should be understood that many forms of the indicator may be constructed wherein two indicating mediums for relative humidity and temperature respectively provide reading of proper or improper combinations of moisture and heat in the air to which the indicator is subjected, and which fall within the spirit and scope of my invention.

I claim:

1. An air condition indicator as described comprising, a hygrostatic element, a thermostatic element, indicator hands mounted for rotation about fixed axes, one for each of said elements, said elements and said hands being so arranged that the hands will move in parallel planes and cross one another throughout the entire range of normal operation thereof, a dial having relative humidity and temperature scales thereon in registration with the indicator hands including scale lines extending along radii developed from the axes of the indicator hands associated with the hygrostatic and thermostatic elements respectively, said dial being further provided with an area marked thereon representing a combination of relative humidity and temperature conducive to health and comfort, the existence of which in air surrounding the indicator is evidenced by the crossing of said hands over said area.

2. A device for indicating healthful and comfortable condition of air with respect to relative humidity and temperature which comprises, a hygrostatic element, a thermostatic element, indicator hands mounted for rotation about fixed axes, one for each of said elements, and an indicator dial, said elements and hands being so arranged with respect to one another and said dial as to cause said hands to move independently over said dial in response to relative humidity and temperature changes respectively, said dial having indicia thereupon including scale lines for humidity and temperature extending along radii developed from the axes of the indicator hands for the hydrostatic and thermostatic elements respectively in cooperative relationship with both of said hands for indicating proper relationship between humidity and temperature for health and comfort, said indicia including an area marked on said dial at the intersection of certain of said scale lines indicating said proper relationship between relative humidity and temperature when said indicator hands cross one another over said area.

3. An air condition indicator as described comprising, a hygrostatic element, a thermostatic element, indicator hands, one for each of said elements, said elements and said hands being so arranged that the hands will move in parallel planes and cross one another throughout the entire range of normal operation thereof, and a dial having relative humidity and temperature scales thereon in registration with the indicator hands associated with the hygrostatic and thermostatic elements respectively, a portion of said dial having an area marked thereupon representing proper relationships between humidity and temperature for health and comfort, the existence of which is evidenced by the crossing of said hands over said area.

FRANK BULLOCK.